United States Patent [19]
Rumberger

[11] Patent Number: 5,232,183
[45] Date of Patent: Aug. 3, 1993

[54] HELICOPTER ANTI-TORQUE CONTROL SYSTEM UTILIZING EXHAUST GAS

[75] Inventor: William E. Rumberger, Newtown Square, Pa.

[73] Assignee: The Boeing Company, Seattle, Wash.

[21] Appl. No.: 665,239

[22] Filed: Mar. 6, 1991

[51] Int. Cl.⁵ ............... B64C 15/02; B64C 27/06; B64C 27/82
[52] U.S. Cl. ................... 244/17.19; 244/52; 239/265.29
[58] Field of Search ............ 244/17.11, 17.19, 52; 239/265.27, 265.29, 265.31

[56] References Cited
U.S. PATENT DOCUMENTS

| | | | |
|---|---|---|---|
| 2,486,272 | 12/1963 | Gazda | 244/17.19 |
| 2,518,697 | 8/1950 | Lee | 244/17.19 |
| 3,015,460 | 1/1962 | Christenson | 244/79 |
| 3,807,662 | 4/1974 | Velazquez | 244/17.19 |
| 3,957,226 | 5/1976 | Daggett, Jr. | 244/17.19 |
| 4,200,252 | 4/1980 | Logan | 244/17.19 |
| 4,660,785 | 4/1987 | Munski | 244/17.19 |
| 4,948,068 | 8/1990 | Van Horn | 244/17.19 |

Primary Examiner—Joseph F. Peters, Jr.
Attorney, Agent, or Firm—Jones, Tullar & Cooper

[57] ABSTRACT

A helicopter anti-torque control system which relies on engine exhaust. Included is a force generating apparatus and a force directing apparatus. The force generating apparatus is at least partly driven by engine exhaust. The force directing apparatus takes outside air delivered to it by the force generating apparatus and directs it from the helicopter as a right-side or left-side force.

9 Claims, 3 Drawing Sheets

HELICOPTER ANTI-TORQUE CONTROL SYSTEM UTILIZING EXHAUST GAS

BACKGROUND OF THE INVENTION

1. Field of the Invention

The invention relates to helicopter anti-torque control utilizing engine exhaust in a unique manner. The helicopter configuration is a single rotor configuration.

2. Prior Art

Typically, in a single rotor helicopter, anti-torque and directional control is achieved by a tail rotor, with the magnitude of the torque produced being controlled by tail rotor collective control.

A number of designs have been suggested according to which the tail rotor is replaced by air jets located in the tail boom of the helicopter. In some of these designs, engine exhaust is used as a working medium directed out of the jets.

One such design is disclosed in U.S. Pat. No. 2,486,272, which uses engine exhaust gases to supply the intake of an air compressor which in turn provides compressed gas for both propulsion and anti-torque control.

Another design disclosed in U.S. Pat. No. 2,518,697 uses exhaust gas mixed with engine cooling air. Other designs are disclosed in U.S. Pat. Nos. 3,015,460 and 3,957,226.

Using exhaust gas for anti-torque control, while perhaps convenient, carries with it the inherent problem of IR (INFRA RED) detection, i.e., the air jet output carries the same IR signature as that of the exhaust gas. In a combat situation, this condition is clearly unacceptable.

It would, therefore, be desirable to have an anti-torque control which utilizes engine exhaust but which also substantially reduces, IR levels.

SUMMARY OF THE INVENTION

An anti-torque control system for a single rotor helicopter without an anti-torque rotor is proposed which utilizes engine exhaust to assist in generating an anti-torque force.

The system employs a force generating apparatus driven either partly directly from the helicopter main transmission source and partly from engine exhaust, or entirely by engine exhaust. The force generating apparatus draws in outside air and moves it to a force directing apparatus located toward the aft end of the helicopter tail boom. The force directing apparatus changes the direction of the ducted air to direct it to the left or right side of the tail boom to effect anti-torque control.

By using the exhaust gas to operate the force generating apparatus and not passing it out of the helicopter directly or for control, the energy in the exhaust gas is reduced. This energy reduction is achieved through enthalpy losses due to three active mechanics which are: (1) work performed by the gas on the apparatus, (2) an active cooling of the exhaust gas by adjacent cool air ducted parallel and surrounding the exhaust gas flow and (3) a reduction in overall mass flow due to the expansion of the exhaust gases. These actions reduce the IR levels of the exhaust.

The outside air used for control is maintained separated from the exhaust gas. This outside air has reduced IR level. The result is anti-torque control with a negligible IR signature.

To effect either left side or right side control a simple mechanism is utilized as part of the force directing apparatus. Such a control is initiated by pilot input.

BRIEF DESCRIPTION OF THE DRAWINGS

Five figures have been selected to illustrate the present invention in the form of a preferred embodiment and a variant thereof. While these figures are schematic, they are sufficiently detailed to enable one skilled in the art to understand and practice the invention.

Included as part of the preferred embodiment is a fan serving as part of the force generating apparatus and a series of vanes serving as part of the force directing apparatus. Included are.

DETAILED DESCRIPTION OF THE PREFERRED EMBODIMENTS

Figure 1:
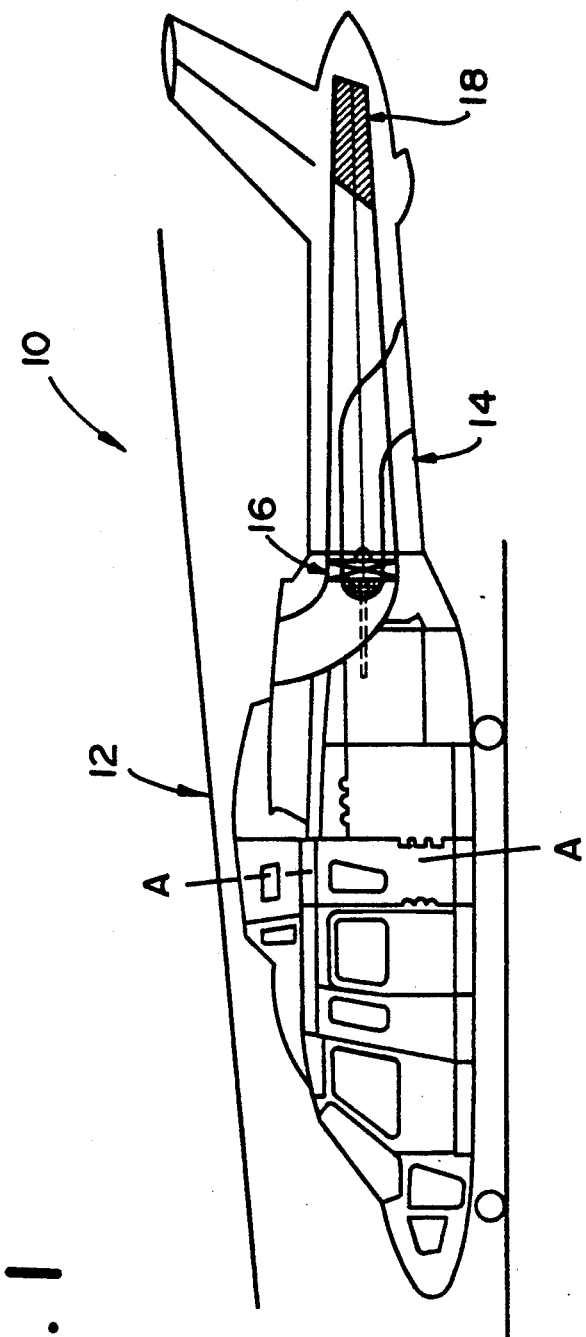
FIG. 1, which is a side elevation view showing a single rotor helicopter with vanes in the tail boom for anti-torque control.
Figure 3:
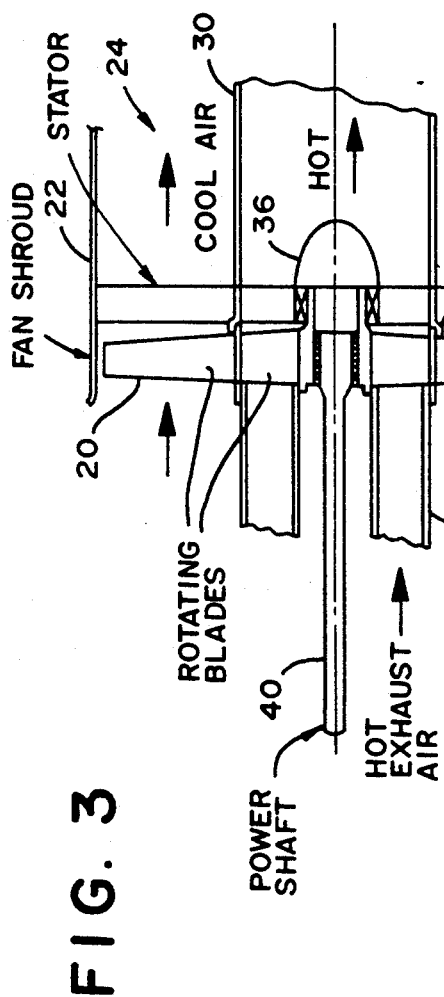
FIG. 3 is a more detailed view of the fan shown in FIG. 2.
Figure 2:
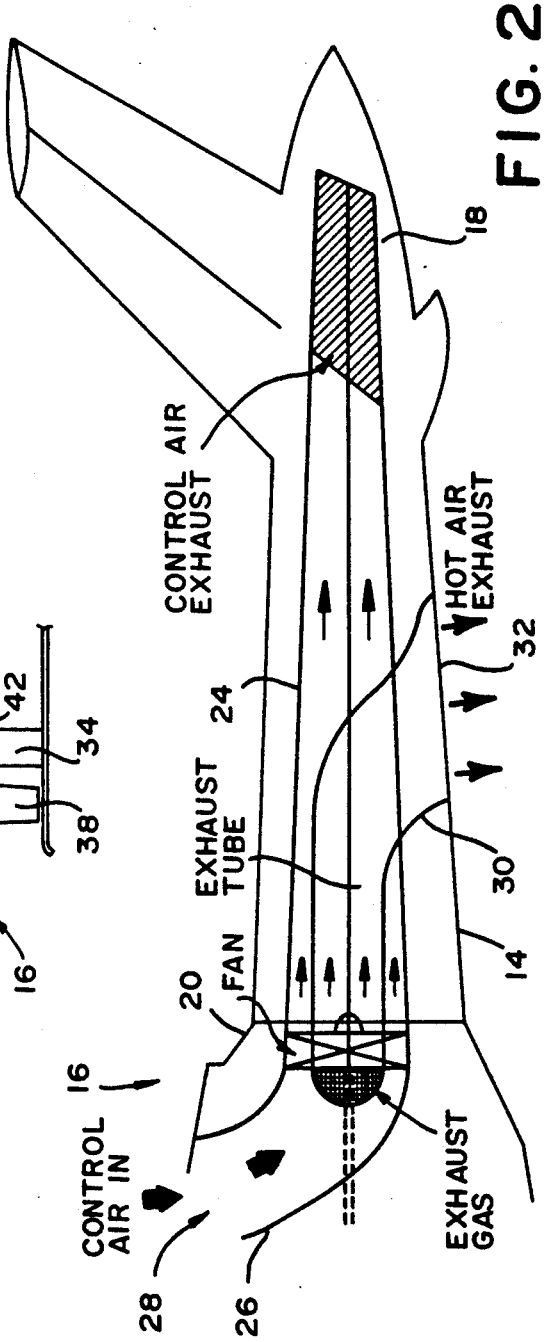
FIG. 2, which is a limited side elevation view of the helicopter shown in FIG. 1, illustrating the relative location of the fan in the tail boom, the direction of exhaust gas flow, and the direction of air flow to the vanes.

The helicopter 10 illustrated in FIG. 1 is a single rotor helicopter, i.e., a single main rotor 12 which produces lift and forward thrust for the helicopter. Typically such a helicopter has a tail rotor (not shown) located at the end of the tail boom 14. The tail rotor produces a force directed outwardly from the tail boom. This force results in a torque which reacts the tendency of the main rotor torque from rotating the helicopter about the main rotor shaft axis A—A. Since this torque opposes the main rotor torque, the force that produces it is referred to as an anti-torque force. This force, moreover, can be varied by pilot input, which in turn varies the anti-torque generated. Directional control of the helicopter is thus effected.

The present invention dispenses with the tail rotor but not with the anti-torque force. A torque reaction to the main rotor torque, or anti-torque, is essential to helicopter operation. This function, then, cannot be dispensed with. It is, however, produced in a different way.

The essential parts of the system which produces the anti-torque force are a force generating apparatus 16, and a force directing apparatus 18. The force generating apparatus generates the anti-torque force by drawing in outside air and moving the air toward the force directing apparatus. For this purpose, engine exhaust is employed, either exclusively or in conjunction with the main or other auxiliary power source on board the helicopter. The force directing apparatus receives the directed air flow and its associated force and directs the air and consequently the force from the helicopter as a right-side or left-side force.

Preferably, and according to one embodiment, the force generating apparatus 16 includes a fan assembly 20 mounted in the tail boom 14. The fan assembly 20 includes a shroud 22 forming part of a cool air duct 24, which connects the force generating apparatus with the force directing apparatus. The shroud 22 is also connected to an air inlet duct 26 through which outside air is drawn to the fan assembly through an inlet 28. The fan assembly 20 also includes a hot air duct 30 which leads to a hot air exhaust opening 32. The two ducts 24 and 30 are concentric to each other at least at the fan location. The fan includes a stator 34 mounted to a housing 36, and a rotor 38 mounted to a power shaft 40. The power shaft 40 is mounted for rotation to the housing 36, and the housing 36 is mounted to the duct 30 in a manner not illustrated since the mounting is conventional.

The power shaft 40 extends to and is driven from the main rotor transmission (not shown). This drive is accordingly imparted to the rotor 38. In addition, the rotor 38 is driven by the exhaust gas. Alternatively, the rotor 38 is driven exclusively by the exhaust gas.

Exhaust gas from one or more of the helicopter engines is delivered by the duct 30 to the fan assembly 20 and drives, or assists in driving in conjunction with the power shaft 40, the rotor 38. The rotor 38 comprises a plurality of blades and a rotary seal 42 which allows the rotor to extend outwardly from the duct 30 without exhaust gas loses.

An advantage of using the exhaust gas as a driving force for the rotor 38 is twofold: (1) the power demands on the helicopter power generating systems is reduced; and (2) the IR emission associated with the exhaust gas is changed, i.e., substantially reduced in the process of driving the rotor 38. Consequently the IR signature of the helicopter can be more effectively reduced. This result inevitably improves operation of the helicopter in a military environment.

Preferably, and according to one embodiment, the force directing apparatus includes a vane assembly 44 located at the aft end of the tail boom (fuselage) 14. The vane assembly 44 is displaceable in the direction of arrows A-F (aft-forward) by an actuator mechanism 46, shown schematically in FIG. 4A.

The vane assembly comprises a canister 48, left-hand vanes 50 and associated openings 52, and a similar plurality of right-hand vanes 54 and associated openings 56. The tail boom 14 includes complementary openings 58 and 60.

The vanes and associated openings form nozzles for directing the cool air flow out of the tail boom.

Cool air from the cool air duct is delivered to the canister 48 and directed out the openings 52, 58; 56, 60 by their respective associated vanes. A wiper type seal 62 prevents air flow between canister 48 and duct 24 and allows the reciprocal movement necessary for the canister 48. Also, the clearance between the outside wall of the canister 48 and the inner wall of the tail boom is such that air flow out the openings is not diverted and the reciprocal movement noted is not impeded.

Figure 4C:
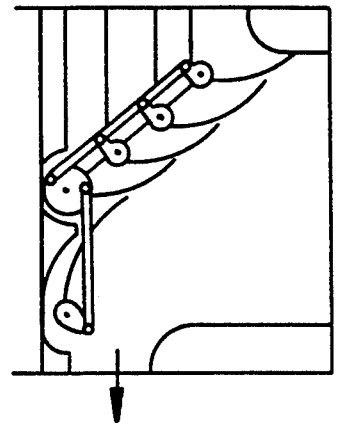
FIGS. 4A–4C which are schematic views of the vane control in a form of vane canister which may be translated from the position shown in FIG. 4A to that shown in FIG. 4C, resulting in right-side air flow to left-side air flow.
Figure 4B:
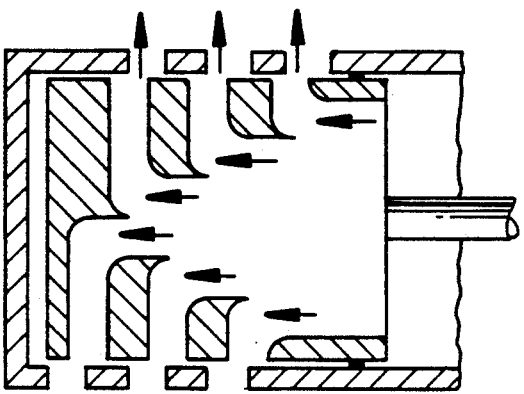
Figure 4A:
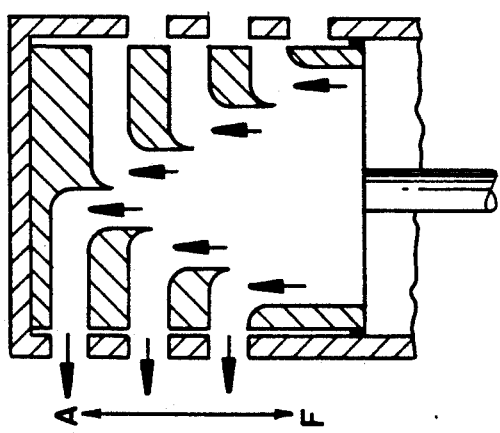

The canister 48 is reciprocated as noted above, by the actuator 46, between the position shown in FIG. 4A to that shown in FIG. 4C, and any position in between.

In the position shown in FIG. 4A there is zero left-side flow and maximum right-side flow (these directions are designated by looking aft of the helicopter). The position shown in FIG. 4B shows a minimal left-hand flow and a slight restriction in the right-hand flow. The position shown in FIG. 4C shows maximum left-side flow and zero right-side flow.

The condition illustrated in FIG. 4A allows for a full right-hand force generation. The condition illustrated in FIG. 4C allows for full left-hand force generation.

Figure 5B:
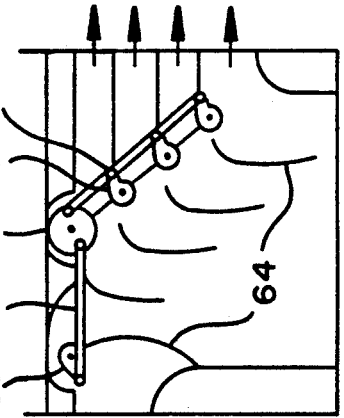
FIGS. 5A and 5B, which are schematic views of a variant of the vane control of the present invention, showing right-side (FIG. 5A) and left-side (FIG. 5B) control.
Figure 5A:
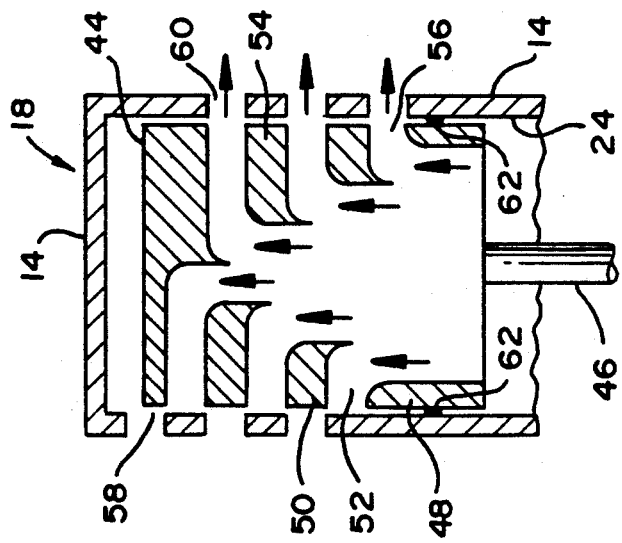

According to an alternative embodiment shown in FIGS. 5A and 5B, the vane assembly 44 comprises a series of pivoting vanes 64 each controlled by a crank 66 joined by a drive bar 68 (left-side) or 70 (right-side). Preferably, one of the cranks is connected to a motor, indicated by the numeral 72. The crank connected to the motor 72 serves as the drive crank which drives the other cranks through the ratchet gear. As in the embodiment of FIGS. 4A-4C, the vane pivoting can be cycled between a maximum right-side opening and a zero left-side opening (FIG. 5A) to a zero right-side opening and maximum left-side opening (FIG. 5B).

In either embodiment, a single actuator (46 in FIGS. 4A-4C, or motor 72 in FIGS. 5A-5B) is employed to achieve a complete range of vane openings to effect the desired level of anti-torque and directional control.

What is claimed is:

1. A helicopter anti-torque control system, comprising:

force directing apparatus for directing air from the helicopter as a right-side or left-side force;

force generating apparatus including means for drawing outside air into the helicopter and moving the air toward said force directing apparatus, said means for drawing outside air being at least partly driven by engine exhaust; and separating means connected to said force directing apparatus and said force generating apparatus for maintaining the outside air separate from the exhaust gas in its movement from said force generating apparatus to said force directing apparatus.

2. The helicopter anti-torque control system as defined in claim 1, wherein said force directing apparatus includes a plurality of vanes and means for adjusting the position of the vanes to thereby adjust the direction and magnitude of the generated force.

3. The helicopter anti-torque control system as defined in claim 2, wherein the plurality of vanes are adjusted in unison.

4. The helicopter anti-torque control system as defined in claim 2, wherein the means for adjusting the position of the vanes includes a single actuator.

5. The helicopter anti-torque control system as defined in claim 1, wherein said force directing apparatus includes a displaceable housing within which a plurality of vanes are mounted, and means for adjusting the position of the vanes to thereby adjust the direction and magnitude of the generated force.

6. The helicopter anti-torque control system as defined in claim 5, wherein the plurality of vanes are adjusted in unison.

7. The helicopter anti-torque control system as defined in claim 6, wherein the means for adjusting the position of the vanes includes a single actuator.

8. The helicopter anti-torque control system as defined in claim 1, wherein said force generating apparatus includes a fan mounted within the helicopter, said fan being driven partly from the helicopter power source and partly by exhaust gas from the helicopter power source.

9. The helicopter anti-torque control system as defined in claim 1, wherein said force generating apparatus includes a fan mounted within the helicopter, said fan being driven by exhaust gas from the helicopter power source.

* * * * *